US012251938B2

(12) United States Patent
Suzuki

(10) Patent No.: US 12,251,938 B2
(45) Date of Patent: Mar. 18, 2025

(54) IMAGE FORMING APPARATUS INCLUDING MAIN CASING TO WHICH CONSUMABLE INCLUDING CONSUMABLE MEMORY IS ATTACHABLE

(71) Applicant: BROTHER KOGYO KABUSHIKI KAISHA, Nagoya (JP)

(72) Inventor: Takayuki Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 139 days.

(21) Appl. No.: 18/190,635

(22) Filed: Mar. 27, 2023

(65) Prior Publication Data

US 2023/0311529 A1 Oct. 5, 2023

(30) Foreign Application Priority Data

Apr. 1, 2022 (JP) ................................ 2022-062142

(51) Int. Cl.
*B41J 2/175* (2006.01)
*H04N 1/00* (2006.01)

(52) U.S. Cl.
CPC ....... *B41J 2/17546* (2013.01); *B41J 2/17566* (2013.01); *H04N 1/00965* (2013.01); *B41J 2002/17589* (2013.01)

(58) Field of Classification Search
CPC ................ B41J 2/17546; B41J 2/17543; B41J 2/17566; B41J 2002/17589; H04N 1/00965; G06F 3/1239
See application file for complete search history.

(56) References Cited

U.S. PATENT DOCUMENTS

2005/0060546 A1* 3/2005 Parry .................. B41J 2/17546 713/171
2016/0011554 A1* 1/2016 Shipman ................ G06F 21/10 399/81

(Continued)

FOREIGN PATENT DOCUMENTS

JP 2001-228760 A 8/2001
JP 2022-085742 A 6/2022

(Continued)

*Primary Examiner* — Jason S Uhlenhake
(74) *Attorney, Agent, or Firm* — Merchant & Gould P.C.

(57) ABSTRACT

An image forming apparatus includes: a main casing to which a consumable including a consumable memory is attachable; a main memory; and a controller configured to perform: when the consumable is new, storing identification information of the consumable in the main memory; when the consumable is used and is a special consumable, determining whether the identification information is stored in the main memory; when the identification information is stored in the main memory, permitting use of the consumable; when the identification information is not stored in the main memory; prohibiting use of the consumable; and while an external memory is physically connected to the main casing, storing the identification information in the external memory. By the external memory being physically connected to another image forming apparatus, the another image forming apparatus permits use of the consumable therein on the basis of the identification information stored in the external memory.

8 Claims, 7 Drawing Sheets

(56) References Cited

U.S. PATENT DOCUMENTS

| | | | | |
|---|---|---|---|---|
| 2018/0131831 | A1* | 5/2018 | Tolia | G06F 3/1229 |
| 2021/0387458 | A1* | 12/2021 | Bhaskaran | B41J 2/17566 |
| 2022/0171318 | A1 | 6/2022 | Kaigawa | |
| 2022/0171583 | A1 | 6/2022 | Suzuki | |
| 2022/0171585 | A1 | 6/2022 | Hattori | |

FOREIGN PATENT DOCUMENTS

| | | | |
|---|---|---|---|
| JP | 2022-085744 | A | 6/2022 |
| JP | 2022-085751 | A | 6/2022 |

* cited by examiner

IMAGE FORMING APPARATUS INCLUDING MAIN CASING TO WHICH CONSUMABLE INCLUDING CONSUMABLE MEMORY IS ATTACHABLE

REFERENCE TO RELATED APPLICATIONS

This application claims priority from Japanese Patent Application No. 2022-062142 filed on Apr. 1, 2022. The entire content of the priority application is incorporated herein by reference.

BACKGROUND ART

In recent years, flat-rate printing services have been widely offered to users of image forming apparatuses. The flat-rate printing services are also called as “subscription service” and allow a user to subscribe to a printing service for each image forming apparatus. For example, the user is permitted to print up to a preset number of sheets within a prescribed period at a fixed rate on a contracted machine, i.e., an image forming apparatus for which the user has entered into an agreement to use the flat-rate printing service.

Under a flat-rate printing service, generally the service provider specifies that subscription consumables for exclusive use with the flat-rate printing service are to be used on the image forming apparatus under the agreement. For example, a prior art describes a technology for differentiating between subscription consumables and normal consumables that can be used irrespective of whether or not the user is subscribed to a service. The prior art also describes a technology for managing subscription consumables in association with contracted machines so that the subscription consumables are used on specific contracted machines.

Another prior art describes an image forming apparatus having a function for detecting the usage level of a cartridge that accommodates therein a recording material and outputting an order request for a new cartridge to an administrator’s information processing device, for example, when the usage level of the recording material meets a prescribed condition. After outputting the order request of a cartridge, the image forming apparatus also stores an on-order flag into a memory of the image forming apparatus so that the on-order flag indicates that the order has been placed. The on-order flag is stored in association with the cartridge currently used that is the subject of the order request. Thus, the other prior art describes a technology for preventing duplicate orders of cartridges.

DESCRIPTION

However, if a user enrolled in such a subscription service enters a new agreement for the same model of image forming apparatus due to the image forming apparatus under an agreement malfunctioning or reaching the end of its service life, the subscription consumables attached to the previous image forming apparatus cannot be used in the new image forming apparatus, regardless of whether the subscription consumables still hold remaining consumables. Further, storing information in the memory of a newly contracted image forming apparatus to indicate that a new cartridge for the attached cartridge has already been ordered in order to prevent duplicate orders of subscription consumables may complicate the management of orders for cartridges.

In view of the foregoing, it is an object of the present disclosure to provide a technology for permitting use of subscription consumables in other image forming apparatuses subjected to an agreement and for preventing duplicate orders of subscription consumables.

In order to attain the above and other object, the present disclosure provides an image forming apparatus including: a main casing to which a consumable is attachable; a main memory; and a controller. The consumable includes a consumable memory storing therein: status information indicating whether the consumable is new or used; identification information for individually identifying the consumable; usage information indicating a usage level of the consumable; and type information indicating whether the consumable is a special consumable that can be used in the image forming apparatus when the image forming apparatus is under a concluded agreement or a normal consumable that can be used in the image forming apparatus irrespective of whether or not the image forming apparatus is under the concluded agreement. The controller is configured to perform: when the status information indicates that the consumable is new, storing the identification information in the main memory; when the status information indicates that the consumable is new, overwriting the status information so that the status information indicates that the consumable is used; when the status information indicates that the consumable is used and the type information indicates that the consumable is the special consumable, determining whether the identification information is already stored in the main memory; when determining that the identification information is already stored in the main memory, permitting use of the consumable in the image forming apparatus; and when determining that the identification information is not stored in the main memory, prohibiting use of the consumable in the image forming apparatus; when the usage information indicates that the usage level is greater than or equal to a prescribed value and the type information indicates that the consumable is the special consumable, storing on-order information in the consumable memory, the on-order information indicating that an order has been placed for a new consumable; and in a state where an external memory that can be physically connected to the main casing from an outside of the main casing is connected to the main casing, storing the identification information stored in the main memory in the external memory. By the external memory being physically connected to another image forming apparatus, the another image forming apparatus permits use of the consumable in the another image forming apparatus on the basis of the identification information stored in the external memory.

According to another aspect, the present disclosure also provides a method of controlling an image forming apparatus including a main memory and a main casing to which a consumable is attachable. The consumable includes a consumable memory storing therein status information, identification information for individually identifying the consumable, usage information, and type information. The status information indicates whether the consumable is new or used. The usage information indicates a usage level of the consumable. The type information indicates whether the consumable is a special consumable that can be used in the image forming apparatus when the image forming apparatus is under a concluded agreement or a normal consumable that can be used in the image forming apparatus irrespective of whether or not the image forming apparatus is under the concluded agreement. The method includes: when the status information indicates that the consumable is new, storing the identification information in the main memory; when the status information indicates that the consumable is new, overwriting the status information so that the status information indicates that the consumable is used; when the status information indicates that the consumable is used and the type information indicates that the consumable is the special consumable, determining whether the identification information is already stored in the main memory; when determining that the identification information is already stored in the main memory, permitting use of the consumable in the image forming apparatus; and prohibiting, when determining that the identification information is not stored in the main memory, prohibiting use of the consumable in the image forming apparatus; when the usage information indicates that the usage level is greater than or equal to a prescribed value and the type information indicates that the consumable is the special consumable, storing on-order information in the consumable memory, the on-order information indicating that an order has been placed for a new consumable; in a state where an external memory that can be physically connected to the main casing from an outside of the main casing is connected to the main casing, storing the identification information stored in the main memory in the external memory; and when the external memory is physically connected to another image forming apparatus, permitting use of the consumable in the another image forming apparatus on the basis of the identification information stored in the external memory.

In the above structure of the both aspects, in the another image forming apparatus, the identification information stored in the external memory is stored in a main memory by connecting the external memory to the another image forming apparatus. Then, when the status information indicates that the consumable is used and the type information indicates that the consumable is the special cartridge, the another image forming apparatus determines whether the identification information of the consumable is stored in the main memory. When the identification information of the consumable is stored in the main memory (the identification information copied from the external memory), the another image forming apparatus permits use of the consumable. As such, the consumable i.e., the special consumable that has been used in the image forming apparatus can also be used in the another image forming apparatus under a concluded agreement.

Hereinafter, one embodiment of the present disclosure will be described while referring to FIGS. 1 through 7. In the present embodiment, a case is described where image forming apparatuses 1 are laser printers, and image formation is printing. However, the image forming apparatuses 1 may be printers other than the laser printers. For example, the image forming apparatuses 1 may be inkjet printers.

<Overview of Image Formation System>

Figure 1:
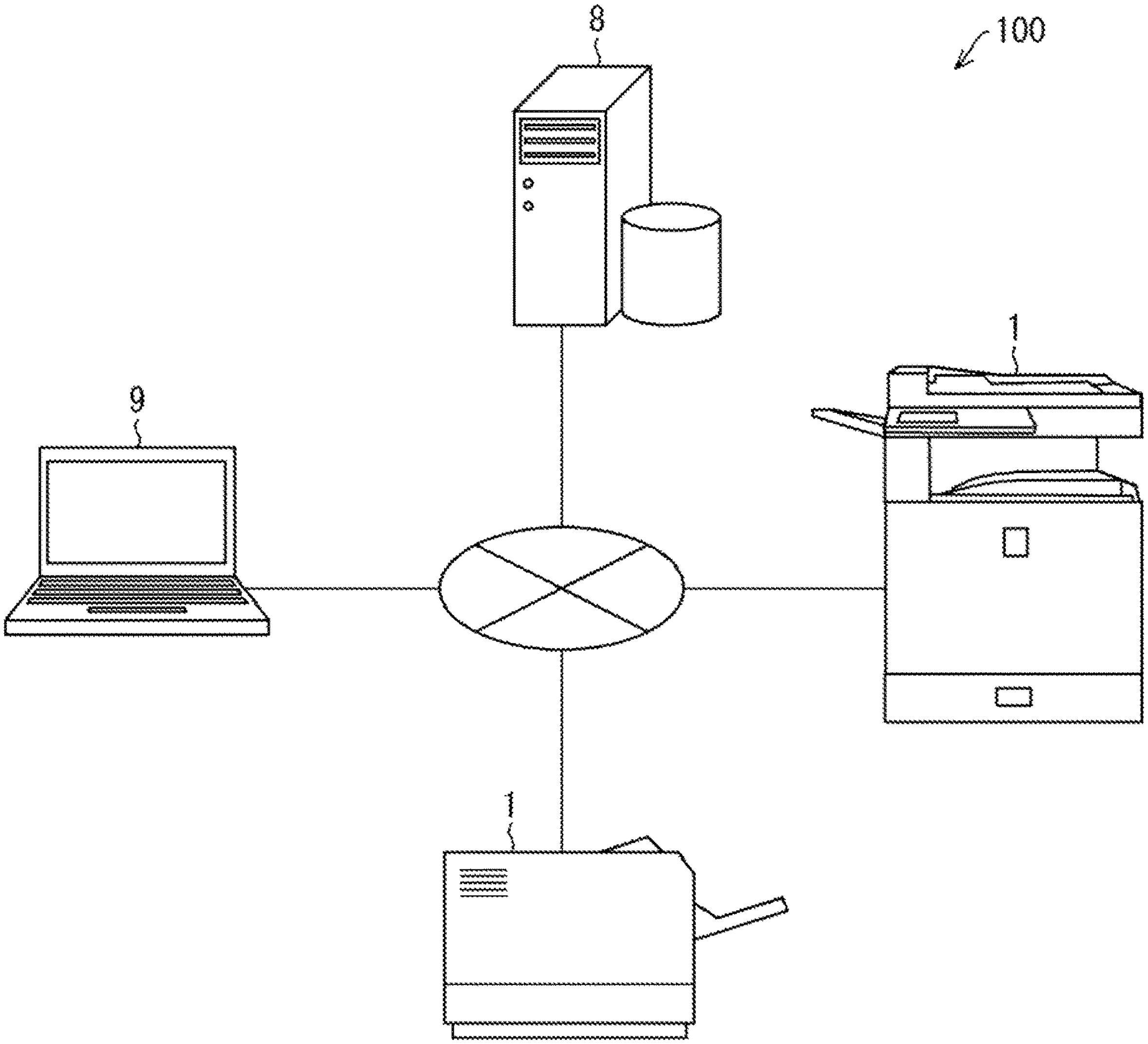
FIG. 1 is a diagram illustrating an overview of an image formation system.

FIG. 1 is a diagram illustrating an overview of an image formation system 100 according to the embodiment. As illustrated in FIG. 1, the image formation system 100 includes a plurality of image forming apparatuses 1, a server 8, and a user terminal 9. The company provides the same user with the plurality of image forming apparatuses 1 illustrated in FIG. 1 upon conclusion of an agreement with the user. However, although not illustrated in the drawings, the image formation system 100 may include other image forming apparatuses purchased by the user.

Each of the image forming apparatuses 1 is a device for implementing a service provided based on an agreement concluded for the image forming apparatus 1. The server 8 is an external device that communicates with the image forming apparatuses 1 via a network, and is an example of a management device for managing the image forming apparatuses 1. In the present embodiment, the server 8 is a server managed by the company.

The "agreement" in the present embodiment denotes a contract concluded between a user and a company under which the company provides the user with a specific service via an image forming apparatus 1 designated by the user or an image forming apparatus 1 that the company has provided the user. In other words, the user concludes an agreement for a certain image forming apparatus 1. Also, the image forming apparatus 1 can be considered as a device subjected to an agreement. Hereinafter, the image forming apparatus 1 designated by the user as the subject of the agreement or the image forming apparatus 1 that the company provided the user will be referred to as "contracted machine".

Once the user has entered a contract with the company, each of the image forming apparatuses 1 is supplied to the user and can be used, for example, at a fixed monthly rate. Further, with an agreement concluded between the user and the company, each image forming apparatus 1 can use special subscription-based consumables at a fixed monthly rate, for example. In an example of the agreement, the company providing the subscription service and the user agree on a usage period, a usage fee, the maximum number of printable pages, and the like of the service, and both parties agree that the company will provide this service with the user.

In other words, once an agreement for the service is concluded, the image forming apparatus 1 in the present embodiment can execute subscription printing, which is printing using subscription-based consumables under the details of the concluded agreement. Further, once an agreement for the service is concluded, the image forming apparatus 1 in the present embodiment may be enabled to be used under the details of the agreement.

The user can register or change the image forming apparatus 1 serving as the contracted machine at any time. Here, the term "register" may indicate registering a new image forming apparatus 1 or re-registering a previously registered image forming apparatus 1 whose agreement is cancelled. The user can also register a plurality of image forming apparatuses 1 as contracted machines. In other words, the user can use a plurality of image forming apparatuses 1 simultaneously as contracted machines, and can change the image forming apparatus 1 targeted as the contracted machine from one image forming apparatus 1 to another image forming apparatus 1.

The user terminal 9 used by the user is a device that communicates with the server 8 in order to conclude and cancel the agreement and to perform other procedures. An information processing terminal equipped with standard communication functions, such as a personal computer (PC) or a smartphone, can be employed as the user terminal 9. The user may also issue a print command to the image forming apparatus 1 through the user terminal 9 to print a desired number of sheets using the subscription-based consumables. The devices configuring the image formation system 100 can communicate with one another over a communication network such as the Internet.

<Overall Structure of Image Forming Apparatuses 1>

Figure 2:
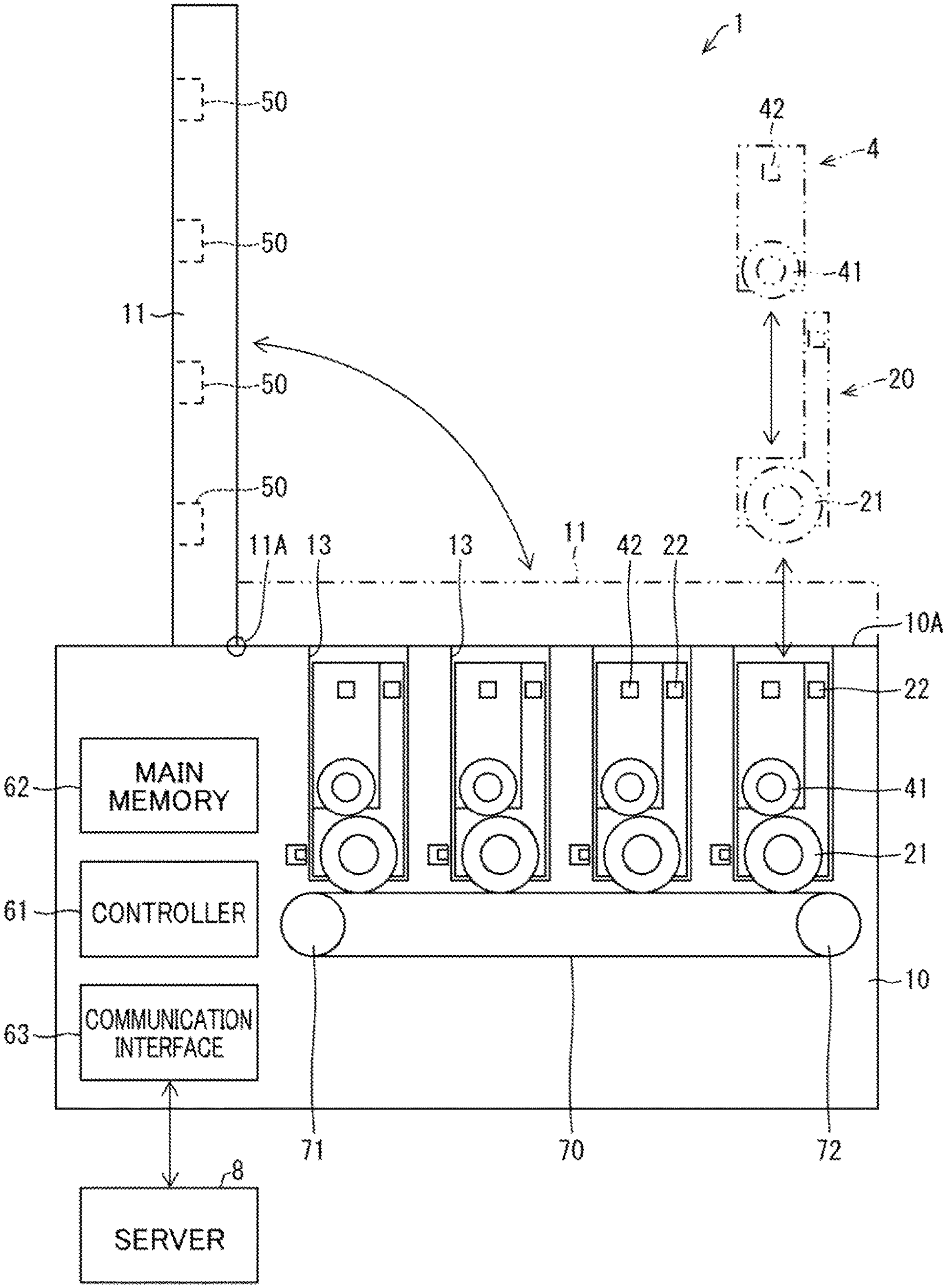
FIG. 2 is a schematic diagram of an image forming apparatus in the image formation system.
Figure 3:
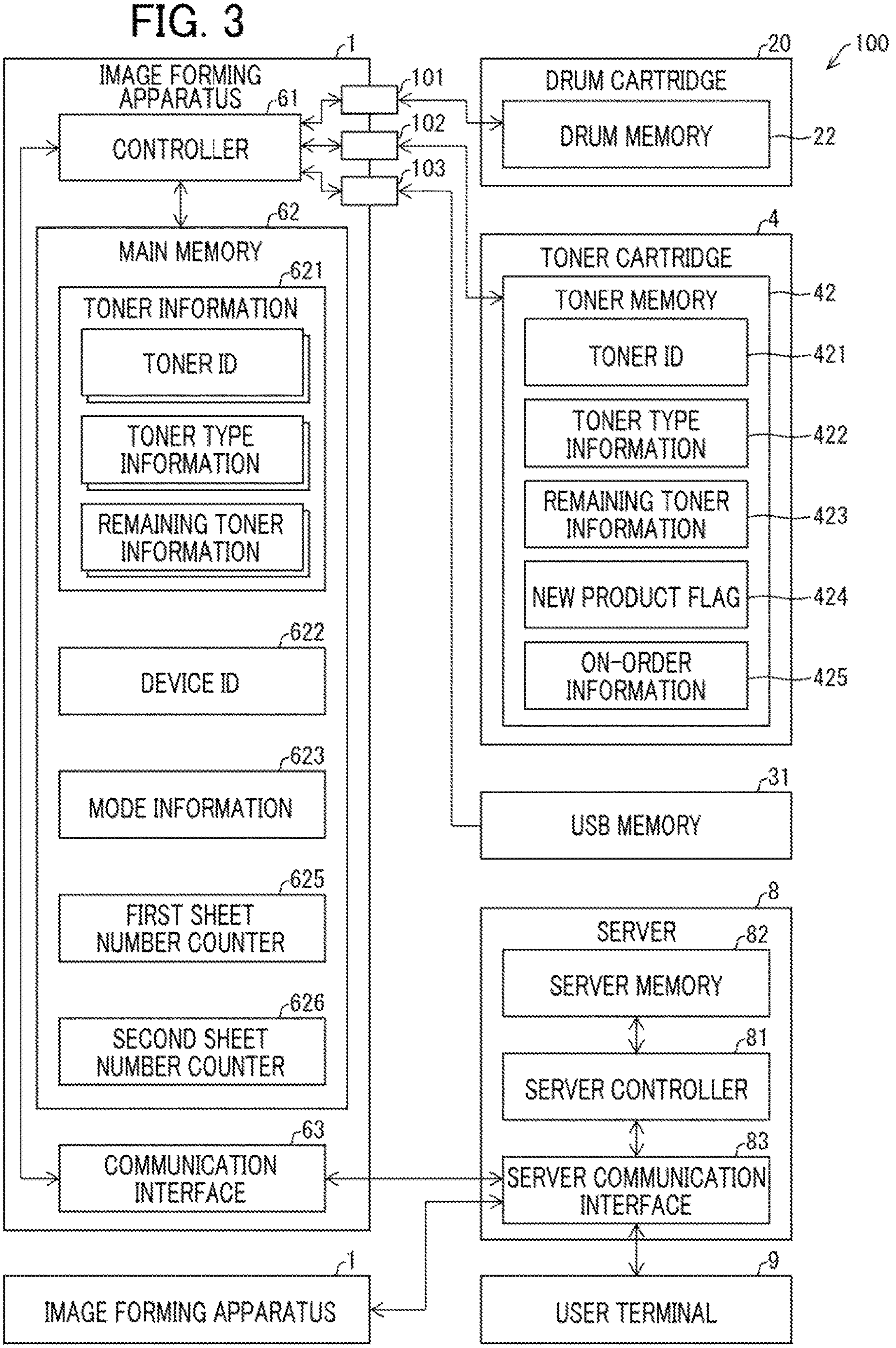
FIG. 3 is a diagram illustrating an internal structure of each of a server and the image forming apparatus including drum cartridges and toner cartridges, and illustrating connection relationship between the server and the image forming apparatus.

FIG. 2 is a schematic diagram of the image forming apparatus 1. FIG. 3 illustrates the internal structures of the image forming apparatuses 1 including drum cartridges 20 and toner cartridges 4 and the server 8; and the connection relationship of the image forming apparatuses 1 and the server 8. While FIG. 3 includes two image forming apparatuses 1, both image forming apparatuses 1 have the structures the same as each other.

As illustrated in FIG. 2, the image forming apparatus 1 includes a main casing 10, and a cover 11. Although not illustrated in the drawings, the image forming apparatus 1 may also include a display portion that includes a liquid crystal display, lamps, and the like; and an input interface that includes buttons and the like. Alternatively, the liquid crystal display may be integrally configured with a touch-screen to function as an input interface.

<Main Casing 10>

Toner cartridges 4 are attachable to the main casing 10 of the image forming apparatus 1. As will be described later in detail, each of the toner cartridges 4 is attachable to a corresponding one of drum cartridges 20 to be integrated therewith. That is, while attached to the drum cartridge 20, the toner cartridge 4 is attached together with the drum cartridge 20 to the main casing 10, thereby achieving the image forming apparatus 1 that includes the drum cartridges 20 and the toner cartridges 4.

Note that, in the image forming apparatus 1 according to the present embodiment, four toner cartridges 4 needs to be attached to the main casing 10 in order to perform printing. In other words, in the image forming apparatus 1 according to the present embodiment, four drum cartridges 20 and four toner cartridges 4 are attachable to the main casing 10. However, the numbers of drum cartridges 20 and toner cartridges 4 attachable to the image forming apparatus 1 are not limited to the example of FIG. 2. For example, the image forming apparatus 1 may be a monochromatic printer that allows attachment of a single drum cartridge 20 and a single toner cartridge 4.

Each of the toner cartridges 4 includes toner that is consumed when the image forming apparatus 1 performs printing. That is, the toner cartridges 4 are examples of consumables for the image forming apparatus 1. Further, each of the drum cartridges 20 includes a photosensitive drum 21 that is used for printing executed in the image forming apparatus 1. The drum cartridges 20 are also examples of consumables for the image forming apparatus 1.

The main casing 10 has a rectangular-parallelepiped box shape, for example. The four drum cartridges 20, the four toner cartridges 4, a transfer belt 70, a controller 61, a main memory 62, and a communication interface 63 are accommodated in the main casing 10. The main casing 10 has four cartridge retaining portions 13. Each of the cartridge retaining portions 13 is formed as a recess and has an opening. The drum cartridges 20 and the toner cartridges 4 are retained in corresponding cartridge retaining portions 13 when attached to the main casing 10.

<Cover 11>

A plurality of light source units 50 are provided corresponding to the drum cartridges 20 at the cover 11 of the image forming apparatus 1. That is, the image forming apparatus 1 includes four light source units 50. The cover 11 is movable (pivotally movable) about a pivot shaft 11A extending in a first direction between an open position (a position indicated by solid lines in FIG. 2) in which the cover 11 opens an opening 10A, and a closed position (a position indicated by two-dotted chain lines in FIG. 2) in which the cover 11 closes the opening 10A. In other words, the opening 10A formed in an upper end of the main casing 10 is opened and closed by the pivotal movement of the cover 11. Note that the "first direction" denotes a direction in which a rotation center axis (a developing axis) of a developing roller of a toner cartridge extends.

The openings of the cartridge retaining portions 13 are opened when the cover 11 is in the open position, and are covered by the cover 11 when the cover 11 is in the closed position.

A cover sensor (not illustrated) may be provided at the opening 10A in the main casing 10. The cover sensor is configured to detect that the cover 11 is in the closed position. The cover sensor may be a contact-type sensor or an optical sensor, for example.

<Toner Cartridges 4>

Each of the toner cartridges 4 includes a developing roller 41, and a cartridge casing that can accommodate therein developer (e.g., toner) which is an example of the printing material. Each of the toner cartridges 4 is attachable to the main casing 10. The four toner cartridges 4 accommodate therein developer of colors different from one another (for example, colors of cyan, magenta, yellow, and black) as the material used for forming images. The developer is a consumable that is consumed during use of the toner cartridge 4.

The developing roller 41 is a cylindrical member that extends in the first direction and is rotatable about its developing axis extending in the first direction. When the toner cartridge 4 is attached to the corresponding drum cartridge 20, an outer circumferential surface of the photosensitive drum 21 contacts an outer circumferential surface of the developing roller 41.

Each of the toner cartridges 4 also includes a toner memory 42 as an example of the consumable memory. The toner memory 42 is positioned on an outer surface of the toner cartridge 4 at one side in the first direction. The toner memory 42 is a memory to which information is writable and from which information is readable. For example, the toner memory 42 may be a flash read-only memory (flash ROM) or an electrically erasable programmable read-only memory (EEPROM). "EEPROM" is a registered Japanese trademark of Renesas Electronics Corporation.

As illustrated in FIG. 3, each of the toner memories 42 has a first area 421, a second area 422, a third area 423, a fourth area 424, and a fifth area 425 for storing information related to the toner cartridge 4. The toner memory 42 stores a toner ID as an example of the identification information in the first area 421. The toner memory 42 stores toner type information as an example of the type information in the second area 422. The toner memory 42 stores remaining toner information in the third area 423. Note that the third area 423 is a rewritable area in which data stored therein can be rewritten. The toner memory 42 stores a new product flag as an example of the status information in the fourth area 424. The toner memory 42 stores on-order information in the fifth area 425.

The toner ID is a unique serial number for identifying an individual toner cartridge 4, for example. The toner ID may include information indicating the color of toner in the toner cartridge 4.

The toner type information is information that indicates the type of the toner cartridge 4. There are two types of toner cartridges 4 in the present embodiment. The first type is "special cartridge", which is an example of the special consumable that can be used only in a contracted machine (i.e., only when the image forming apparatus 1 is under a concluded agreement). The second type is "normal cartridge", which is an example of the normal consumable that can also be used in an image forming apparatus 1 that does not serve as a contracted machine. That is, the normal cartridge (i.e., the normal consumable) can be used irrespective of whether or not the image forming apparatus 1 is under a concluded agreement. Note that the toner type information may also be included in the toner ID. That is, the toner ID may be both information for identifying an individual toner cartridge 4 and information indicating the type of the toner cartridge 4.

The remaining toner information indicates a remaining quantity of toner in the toner cartridge 4. In this example, the remaining quantity of toner is a value associated with one of a plurality of levels from full to empty. The value corresponding to the current remaining quantity of toner is stored in the third area 423. Each level of remaining quantity of toner stored in the toner memory 42 may be a character string such as "full", "empty", and the like; may be a numerical value such as "100%", "0%", and the like; or may be information combining a character string and a numerical value based on the value described above.

Here, the usage level of a toner cartridge 4 is the ratio of a toner quantity obtained by subtracting the remaining quantity of toner from the initial quantity of toner in the toner cartridge 4 to the initial quantity of toner in the toner cartridge 4. In other words, the usage level of toner increases as the remaining quantity of toner decreases. That is, the remaining toner quantity indicating the usage level of the toner cartridge is an example of the usage information.

The new product flag stored in the fourth area 424 indicates whether the toner cartridge 4 is a new product or a used product. For example, the toner cartridge 4 is a new product when the fourth area 424 stores therein information indicating that the new product flag is ON, and is a used product when the fourth area 424 stores therein information indicating that the new product flag is OFF.

The on-order information indicates whether a new toner cartridge 4 has been ordered or has not been ordered. The on-order information may include an on-order flag, for example. In this case, the on-order information indicates that a new toner cartridge 4 has been ordered when the fifth area 425 stores therein information indicating that the on-order flag is ON, and indicates that a new toner cartridge 4 has not been ordered when the fifth area 425 stores therein information indicating that the on-order flag is OFF.

<Drum Cartridges 20>

Each of the drum cartridges 20 includes a cartridge casing that is attachable to the main casing 10. The cartridge casing includes the photosensitive drum 21 as a component used for image formation. The photosensitive drum 21 is also an example of the consumables. As the photosensitive drum 21 is used, the outer circumferential surface of the photosensitive drum 21 degrades by wear, for example, requiring the photosensitive drum 21 to be replaced. The photosensitive drum 21 is a cylindrical photosensitive member extending in the first direction, and is rotatable about a drum axis extending in the first direction. The outer circumferential surface of the photosensitive drum 21 is coated with a photosensitive material.

In the present embodiment, each of the drum cartridges 20 also includes a drum memory 22. The drum memory 22 is a memory to which information is writable and from which information is readable. The drum memory 22 is a flash ROM or an EEPROM, for example.

Each of the drum memories 22 stores therein information related to the photosensitive drum 21 of the drum cartridge 20. The drum memory 22 may store therein a drum ID and drum life information. The drum ID is a unique serial number for identifying an individual drum cartridge 20. The drum life information indicates the remaining life of the photosensitive drum 21.

<Attachment of Cartridges and Printing Mechanism>

As illustrated in FIG. 2, the drum cartridges 20 and the toner cartridges 4 are attachable to the main casing 10 in a state where the cover 11 is in the open position. In this state, the drum cartridges 20 and the toner cartridges 4 are inserted through the opening 10A into the corresponding cartridge retaining portions 13.

The main casing 10 also includes connectors 101 and 102. In a state where the drum cartridges 20 are inserted into the corresponding cartridge retaining portions 13, the connectors 101 are electrically connected to the drum memories 22 of the corresponding drum cartridges 20, so that the controller 61 can communicate with the drum memories 22. In a state where the toner cartridges 4 are attached to the main casing 10, the connectors 102 are also electrically connected to the toner memories 42 of the corresponding toner cartridges 4 so that the controller 61 can communicate with the toner memories 42.

The four light source units 50 are mounted on an inner surface of the cover 11. The light source units 50 are disposed such that the light source units 50 face the outer circumferential surfaces of the corresponding photosensitive drums 21 in a state where the drum cartridges 20 are attached to the main casing 10 and the cover 11 is in the closed position. Each of the light source units 50 has a plurality of light sources arranged in the first direction. The arranged light sources can irradiate the outer circumferential surface of the corresponding photosensitive drum 21 with light. The light sources are light-emitting diodes (LEDs), for example.

The light source units 50 are electrically connected to the controller 61. The controller 61 controls the light source units 50 based on inputted image data to emit light from the light sources in the light source units 50. The light sources of the light source units 50 irradiate the outer circumferential surfaces of the corresponding photosensitive drums 21 with light. As a result, the photosensitive material on the outer circumferential surfaces of the photosensitive drums 21 is exposed according to the image data.

The transfer belt 70 is a component configured to transfer developer (e.g., toner) carried on the outer circumferential surfaces of the photosensitive drums 21 onto printing paper. The transfer belt 70 is also an example of the consumable. As the transfer belt 70 is used, an outer peripheral surface of the transfer belt 70 degrades by wear, for example, requiring the transfer belt 70 to be replaced. The transfer belt 70 is a belt (an endless belt) having an annular shape that can contact each of the photosensitive drums 21. Specifically, the outer circumferential surfaces of the photosensitive drums 21 can contact the outer peripheral surface of the transfer belt 70. During a printing process, printing paper is conveyed between the transfer belt 70 and the photosensitive drums 21.

The transfer belt 70 is looped over a drive roller 71 and a follow roller 72. The drive roller 71 drives the transfer belt 70 to circular move. The controller 61 controls the drive roller 71 to rotate. The follow roller 72 is rotated along with the circular movement of the transfer belt 70 according to the drive of the drive roller 71.

<Internal Structure of Main Casing>

The controller 61 has an application-specific integrated circuit (ASIC), for example. The controller 61 is electrically connected to both the main memory 62 and the communication interface 63 those provided in the main casing 10. The controller 61 is configured to execute various processes to control the image forming apparatus 1 to perform a printing process and its related processes.

The controller 61 may also include a processor, such as a CPU. In this case, a control program for implementing a print control method may be stored in the main memory 62. The printing process may be executed in the image forming apparatus 1 by the processor of the controller 61 performing operations according to the control program stored in the main memory 62.

The controller 61 itself may also include a computer-readable storage medium that stores therein the control program. The storage medium may be a "non-transitory tangible medium," such as a read-only memory (ROM), a tape, a disc, a card, a semiconductor memory, or a programmable logic circuit. A random-access memory (RAM) or the like may also be available.

The control program may also be supplied to the computer via any transmission medium (a communication network, broadcast waves, etc.) capable of transmitting the control program. Note that one aspect of the present disclosure is that the control program can be implemented in the form of data signals embedded in a carrier wave, as embodied in electronic transmission.

When the drum cartridge 20 and the toner cartridge 4 are attached to the corresponding cartridge retaining portion 13 of the main casing 10, the drum memory 22 and the toner memory 42 are electrically connected to the controller 61, as illustrated in FIG. 3. In this state, the controller 61 can execute a read process for reading information from the connected drum memory 22 and toner memory 42, and a write process and/or a rewrite process for writing or rewriting information to the drum memory 22 and the toner memory 42.

As illustrated in FIG. 3, the image forming apparatus 1 further includes a USB connector 103. The USB connector 103 is provided on an outer surface of the main casing 10, for example. While a USB memory 31 is inserted into (i.e., physically connected to) the USB connector 103 from outside the main casing 10, the USB connector 103 is electrically connected to the USB memory 31. This connection between the USB connector 103 and the USB memory 31 enables the controller 61 of the main casing 10 to perform a process for reading information from the USB memory 31. Further, while the USB connector 103 is electrically connected to the USB memory 31, the controller 61 can execute a process for writing information to the USB memory 31 and a process for deleting information written in the USB memory 31 therefrom.

The USB memory 31 is an example of the external memory. In place of the USB memory 31, SD cards and external hard disk drives can also serve as an example of the external memory.

The main memory 62 is a memory to which information is writable and from which information is readable. The main memory 62 is a flash ROM or an EEPROM, for example. The main memory 62 has a storage area 621 that stores therein toner information, a storage area 622 that stores therein a device ID, a storage area 623 that stores therein mode information, a storage area 625 that stores therein a first sheet number counter, and a storage area 626 that stores therein a second sheet number counter.

The toner information is information related to the respective toner cartridges 4 attached to the image forming apparatus 1. For example, the toner information may be data associating a toner ID read from a first area 421 of a certain toner memory 42 with toner type information and remaining toner information read from a second area 422 and a third area 423, respectively, in the same toner memory 42. The controller 61 may store data in the storage area 621 of the main memory 62 associating the toner ID for each toner cartridge 4 with their toner type information and remaining toner information so that the data is stored chronologically, irrespective of the color of toner.

The device ID is identification information for identifying the image forming apparatus 1. The device ID may be a serial number of the image forming apparatus 1, for example.

The mode information indicates an operation mode of the image forming apparatus 1. In the present embodiment, the mode information indicates one of two types of modes: a "subscription mode" denoting that the image forming apparatus 1 is registered as a contracted machine, and a "normal mode" denoting that the image forming apparatus 1 is not registered as a contracted machine or that the agreement for the image forming apparatus 1 is cancelled. When the image forming apparatus 1 to be newly subjected to agreement is shipped, a value corresponding to the normal mode is stored in the storage area 623 as an initial value. The controller 61 rewrites the mode information where appropriate.

The first sheet number counter is stored in the storage area 625 in the present embodiment. The first sheet number counter indicates the cumulative number of sheets printed in the image forming apparatus 1. Also, the second sheet number counter is stored in the storage area 626 in the present embodiment. The second sheet number counter indicates the number of sheets printed in the image forming apparatus 1 under the agreement as the subscription printing.

The count of the second sheet number counter may be reset to 0 (zero) each time the image forming apparatus 1 transitions from the subscription mode to the normal mode or may be the cumulative number of sheets printed to date in the image forming apparatus 1 under the agreement as the subscription printing. Unless otherwise specified, the value of the second sheet number counter hereafter will be the cumulative number of sheets printed in the image forming apparatus 1 by the subscription printing (i.e., under the agreement).

The communication interface 63 is a communication interface for conducting communications between the image forming apparatus 1 and the server 8. The communication interface 63 is configured to output various data, notifications, and requests received from the server 8 to the controller 61. Also, the communication interface 63 is configured to transmit various data, notifications, and requests inputted from the controller 61 to the server 8.

<User Terminal 9>

The user terminal 9 includes an input interface for receiving various input operations performed by the user, and a communication interface for communicating with the server 8. The user registers a contracted machine in the server 8 through input operations performed on the user terminal 9. For example, the user inputs, into the user terminal 9, the user's own identification information and identification information for the image forming apparatus 1 that the user wishes to register as a contracted machine. When receiving this input, the user terminal 9 transmits the inputted information to the server 8.

In addition to input operations for registering the contracted machine (i.e., for adding a contracted machine), the user terminal 9 may receive input operations for changing the contracted machine. For example, the user terminal 9 may receive input operations performed by the user to input the user's own identification information, identification information for a new contracted machine after change of the contracted machine, and identification information for the contracted machine before the change of the contracted machine. Subsequently, the user terminal 9 may transmit these three pieces of information to the server 8. When the user inputs print data, such as text or diagrams, via the user terminal 9, the user terminal 9 also outputs print commands to the image forming apparatus 1 based on the inputted print data, thereby directing the image forming apparatus 1 to perform printing based on the print data.

<Server 8>

The server 8 is a management device configured to manage an operation status of the image forming apparatus 1. The server 8 includes a server communication interface 83, a server memory 82, and a server controller 81. The server controller 81 is a central processing unit (CPU) that performs overall control of the server 8. The server memory 82 is a storage device that stores therein data required for operations on the server 8.

The server controller 81 updates a registration table stored in the server memory 82 in accordance with notifications or requests received from the image forming apparatuses 1. The registration table is a data table in which image forming apparatuses 1 that users or the server 8 designated as contracted machines are registered. The registration table also stores therein data for each contracted machine indicating one of that the agreement for the contracted machine is currently valid or that the agreement for the contracted machine is not currently valid.

The server memory 82 stores therein device information and the registration table. Note that data in the server memory 82 is rewritable. The device information is data compiling various information related to the image forming apparatus 1. The device information is stored separately for each image forming apparatus 1. The device information includes at least a device ID. In addition, the device information may include the value of the first sheet number counter and/or the value of the second sheet number counter.

The server communication interface 83 is a communication interface for conducting communications between the server 8 and the image forming apparatuses 1. The server communication interface 83 is configured to output various data, notifications, and requests received from image forming apparatuses 1 to the server controller 81. Also, the server communication interface 83 is configured to transmit various data, notifications, and requests inputted from the server controller 81 to the image forming apparatuses 1.

For example, the server communication interface 83 may receive information from the image forming apparatus 1 including the device ID of the image forming apparatus 1; and the toner ID, the toner type information, the remaining toner information, the new product flag, and the on-order information for each toner cartridge 4 in the image forming apparatus 1, and may output the received information to the server controller 81. The server controller 81 may store the inputted device ID in association with the toner ID, the toner type information, the remaining toner information, the new product flag, and the on-order information for each toner cartridge 4 in the server memory 82 as device information for the image forming apparatus 1.

<Example of Cartridge Determination Process>

Figure 4:
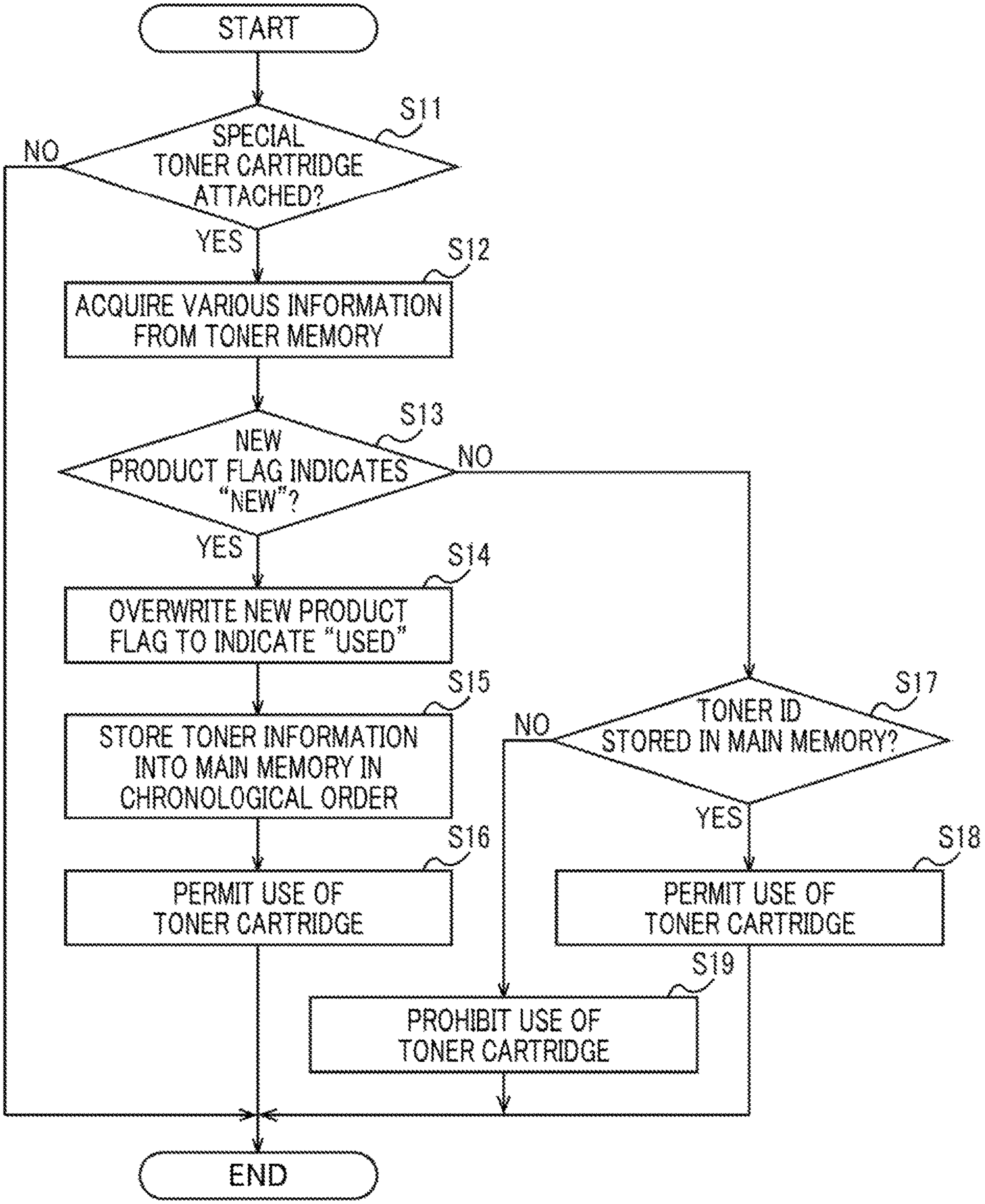
FIG. 4 is a flowchart illustrating an example of steps in a cartridge determination process executed by the image forming apparatus when the toner cartridge is attached thereto.

Next, an example of a cartridge determination process executed by the controller 61 of the image forming apparatus 1 when a toner cartridge(s) 4 is attached to the main casing 10 will be described with reference to FIG. 4. FIG. 4 is a flowchart illustrating an example of steps in the cartridge determination process. The controller 61 of the image forming apparatus 1 executes this process when a toner cartridge 4 is inserted into a corresponding cartridge retaining portion 13 and attached to the main casing 10. The controller 61 executes the process in FIG. 4 each time a prescribed time period has elapsed after a power switch (not illustrated) of the image forming apparatus 1 is turned on. The prescribed time period is a time interval of several milliseconds to several tens of milliseconds, for example.

In S11 at the beginning of the process in FIG. 4, the controller 61 of the image forming apparatus 1 determines whether a new special cartridge has been attached to the main casing 10. Specifically, when toner cartridges 4, while attached to drum cartridges 20, are inserted into the corresponding cartridge retaining portions 13 and attached to the main casing 10, the controller 61 reads the toner IDs from the toner memories 42 of the toner cartridges 4 in sequence. The controller 61 then compares the four toner IDs read from the four toner memories 42 to the most recent toner IDs for the respective colors in the toner information stored in the storage area 621 of the main memory 62.

When the four toner IDs read from the toner memories 42 match the most recent toner IDs in the toner information stored in the storage area 621, the controller 61 determines that a new toner cartridge 4 has not been attached to the main casing 10 (S11: NO). In this case, the controller 61 ends the cartridge determination process.

On the other hand, when any of the toner IDs read from the four toner memories 42 differs from the most recent toner IDs of the corresponding colors included in the toner information stored in the storage area 621, the controller 61 determines that a new toner cartridge 4 has been attached to the main casing 10.

Next, the controller 61 reads the toner type information from the second area 422 of the toner memory 42 in the newly attached toner cartridge 4 and determines whether the type of the toner cartridge 4 indicated by the toner type information is a special cartridge. When the controller 61 determines that the toner type information does not indicate that the type of the toner cartridge 4 is a special cartridge (S11: NO), the controller 61 ends the cartridge determination process. In other words, the controller 61 ends the cartridge determination process when determining that the toner type information indicates that the type of the toner cartridge 4 is a normal cartridge. Here, a special cartridge is an example of a special consumable. Further, a normal cartridge is an example of a normal consumable.

On the other hand, when the controller 61 determines that the toner type information read from the toner memory 42 indicates that type of the newly attached toner cartridge 4 is a special cartridge (S11: YES), the controller 61 advances to the process in S12. In S12 the controller 61 reads various information from the toner memory 42 of the newly attached special cartridge. That is, the controller 61 reads the toner ID, the toner type information, the remaining toner information, the new product flag, and the on-order information from the respective first to fifth areas 421 to 425 of the toner memory 42 in the newly attached special cartridge.

Subsequently, in S13 the controller 61 determines whether the new product flag indicates that the toner cartridge 4 is a new product. Specifically, the controller 61 reads the new product flag from the fourth area 424 of the toner memory 42 in the newly attached special cartridge. In S13 the controller 61 determines whether or not the special cartridge is a new product based on whether the new product flag indicates the special cartridge is a new product or a used product. When the controller 61 determines in S13 that the new product flag indicates that the special cartridge is a new product (S13: YES), the controller 61 advances to the process in S14. In S14 the controller 61 overwrites the information indicating "new" for the new product flag stored in the toner memory 42 with information indicating "used". The controller 61 subsequently advances to the process in S15. The process in S14 is an example of the overwriting.

In S15 the controller 61 stores the toner ID, the toner type information, the remaining toner information, the new product flag, and the on-order information read from the respective first to fifth areas 421 to 425 of the toner memory 42 in S12 in chronological order in the storage area 621 of the main memory 62 as toner information. That is, the controller 61 associates the toner type information, the remaining toner information, the new product flag, and the on-order information read from the toner memory 42 in S12 with the toner ID read from the toner memory 42 in S12 and stores this information chronologically in the storage area 621. The process in S15 is an example of the storing.

In S16 the controller 61 permits use of the newly attached toner cartridge 4 and subsequently ends the cartridge determination process. In this way, the controller 61 permits subscription printing using the newly attached toner cartridge 4.

On the other hand, when the controller 61 determines in S13 that the new product flag indicates that the toner cartridge 4 is a used product (S13: NO), the controller 61 advances to the process in S17. In S17 the controller 61 determines whether the toner ID read from the toner memory 42 in S12 is included in the toner information stored in the storage area 621 of the main memory 62. That is, the controller 61 determines whether the toner ID read in S12 is already stored in the storage area 621 of the main memory 62. The process in S17 is an example of the determining.

When the controller 61 determines in S17 that the toner ID read from the toner memory 42 in S12 is included in the toner information stored in the storage area 621 of the main memory 62 (S17: YES), the controller 61 advances to the process in S18.

In S18 the controller 61 permits use of the toner cartridge 4, and subsequently ends the cartridge determination process. In this way, the controller 61 permits subscription printing using the newly attached toner cartridge 4. The process in S18 is an example of the permitting.

On the other hand, when the controller 61 determines in S17 that the toner ID read from the toner memory 42 in S12 is not included in the toner information stored in the storage area 621 of the main memory 62 (S17: NO), the controller 61 advances to the process in S19.

In S19 the controller 61 prohibits use of the toner cartridge 4, and subsequently ends the cartridge determination process. In this way, the controller 61 prohibits subscription printing using the newly attached toner cartridge 4. The process in S18 is an example of the prohibiting.

<Example of USB Storage Process>

Figure 5:
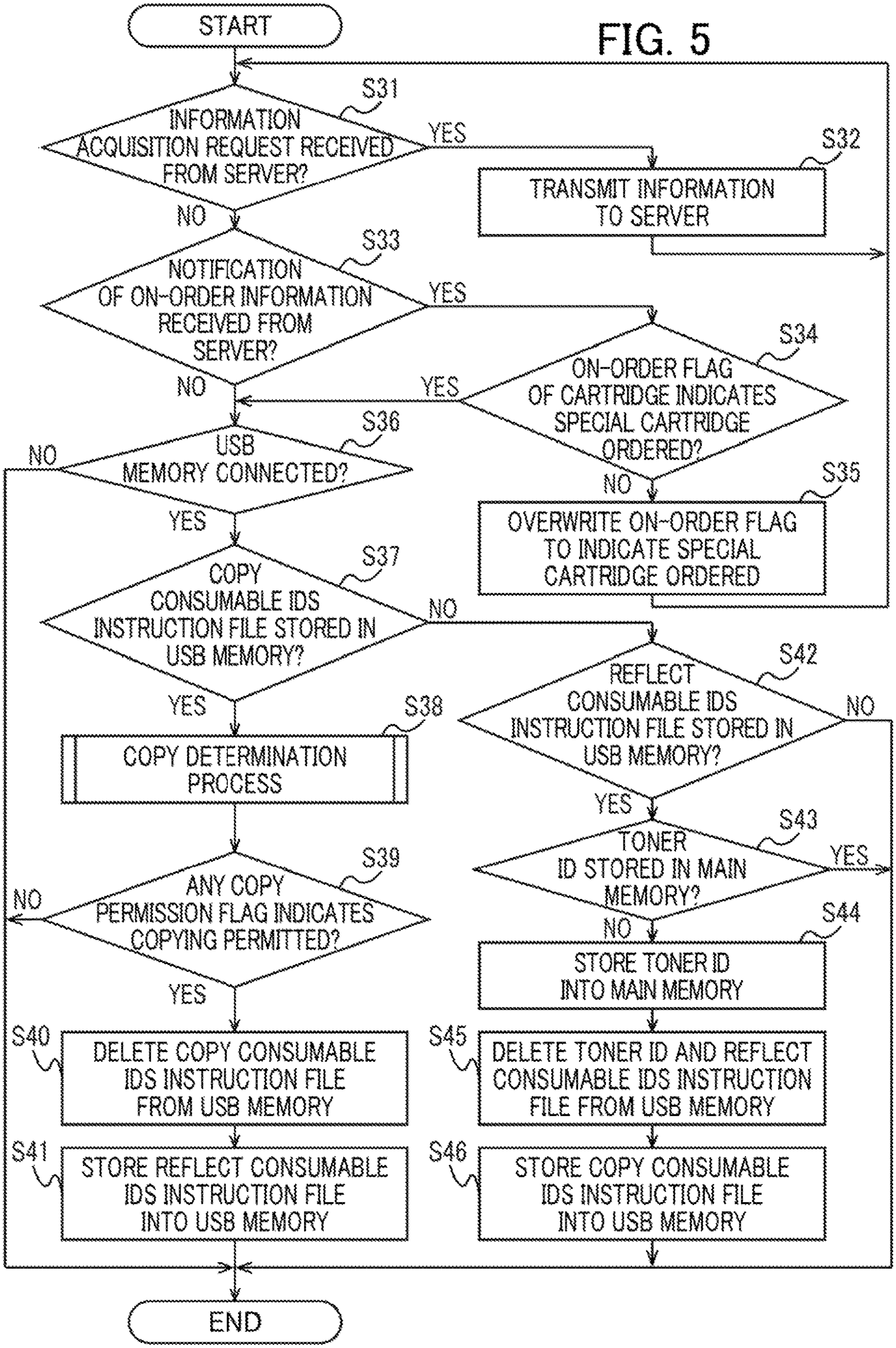
FIG. 5 is a flowchart illustrating an example of steps in a USB storage process executed by the image forming apparatus.
Figure 6:
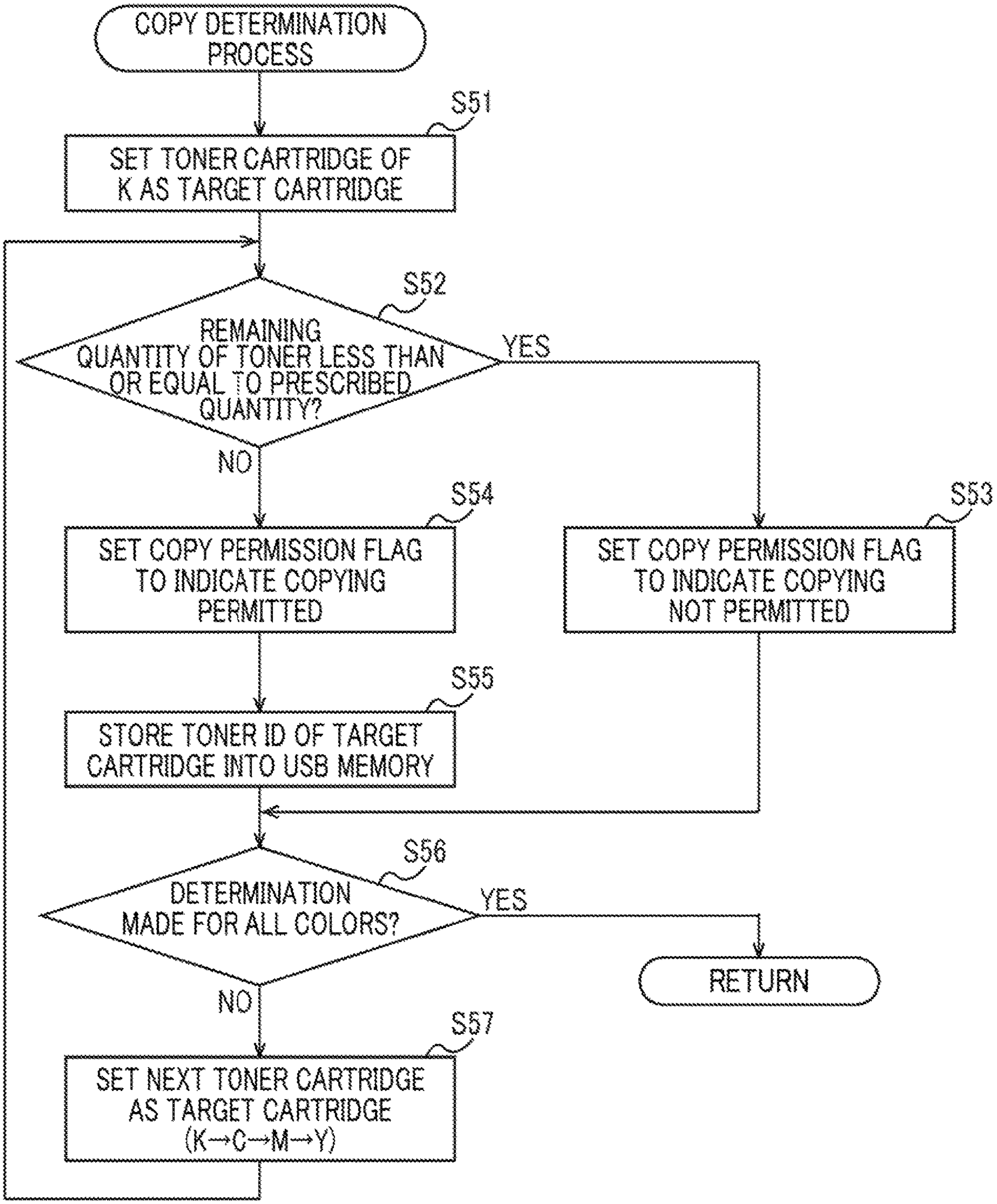
FIG. 6 is a flowchart illustrating an example of steps in a copy determination process which is a subroutine of FIG. 5.

Next, an example of a USB storage process executed by the controller 61 of the image forming apparatus 1 will be described with reference to FIGS. 5 and 6. FIG. 5 is a flowchart illustrating an example of steps in the USB storage process executed by the controller 61. FIG. 6 is a flowchart illustrating an example of steps in a copy determination process, which is a subroutine in the process of FIG. 5. The controller 61 executes the process illustrated in FIG. 5 each time a prescribed time period has elapsed after the power switch (not illustrated) of the image forming apparatus 1 is turned on. The prescribed time period is a time interval of several milliseconds to several tens of milliseconds, for example.

In S31 of FIG. 5, the controller 61 of the image forming apparatus 1 determines whether a notification of an information acquisition request requesting the controller 61 to transmit information related to the toner cartridges 4 has been received from the server 8 via the communication interface 63. When the controller 61 determines in S31 that a notification of such an information acquisition request has been received (S31: YES), the controller 61 advances to the process in S32. In S32 the controller 61 transmits information related to each toner cartridge 4 to the server 8 via the communication interface 63.

For example, the controller 61 sequentially reads the toner ID, the toner type information, the remaining toner information, the new product flag, and the on-order information from the toner memory 42 of each toner cartridge 4. Next, the controller 61 adds the device ID of the image forming apparatus 1 to the read information and transmits the resultant information to the server 8 via the communication interface 63. Subsequently, the controller 61 repeats the process from S31.

On the other hand, when the controller 61 determines in S31 that a notification of an information acquisition request has not been received from the server 8 requesting the acquisition of information related to the toner cartridges 4 (S31: NO), the controller 61 advances to the process in S33. In S33 the controller 61 determines whether a notification of on-order information (i.e., on-order information) has been received from the server 8 via the communication interface 63. On-order information indicates that the server 8 ordered a new special cartridge. The on-order information includes information indicating the color of toner in the special cartridge.

When the controller 61 determines in S33 that a notification of on-order information has been received from the server 8 via the communication interface 63 (S33: YES), the controller 61 advances to the process in S34. In S34 the controller 61 reads an on-order flag from the fifth area 425 of the toner memory 42 in the corresponding special toner cartridge 4. For example, when the controller 61 has received on-order information indicating that a black special cartridge has been ordered, the controller 61 reads the on-order flag from the fifth area 425 of the toner memory 42 in the black special cartridge. The on-order flag indicates whether a special cartridge has been ordered or not.

In S34 the controller 61 subsequently determines whether the on-order flag read from the fifth area 425 of the toner memory 42 indicates that a special cartridge has been ordered. For example, a value of "ON" stored for the on-order flag indicates that a special cartridge has been ordered, while a value of "OFF" indicates that a special cartridge has not been ordered.

When the controller 61 determines in S34 that the on-order flag read from the fifth area 425 of the toner memory 42 indicates that a special cartridge has not been ordered (S34: NO), the controller 61 advances to the process in S35. In S35 the controller 61 overwrites the on-order flag with information indicating that an order for a new special cartridge has been placed, and stores the overwritten information into the fifth area 425 of the toner memory 42. Subsequently, the controller 61 repeats the process from S31. The process in S35 is an example of the storing.

On the other hand, when the controller 61 determines in S34 that the on-order flag read from the fifth area 425 of the toner memory 42 indicates that a special cartridge has already been ordered (S34: YES), the controller 61 advances to the process in S36. In S36 the controller 61 determines whether a USB memory 31 outside of the main casing 10 is electrically connected to the USB connector 103. When the controller 61 determines in S36 that an external USB memory 31 is not electrically to the USB connector 103 (S36: NO), the controller 61 ends the USB storage process. Note that the controller 61 also advances to the process of S36 when the controller 61 determines in S33 that a notification for on-order information has not been received (S33: NO).

On the other hand, when the controller 61 determines in S36 that an external USB memory 31 is electrically connected to the USB connector 103 (S36: YES), the controller 61 advances to the process in S37. In S37 the controller 61 determines whether a "copy consumable IDs" instruction file is stored in the USB memory 31. A "copy consumable IDs" instruction file indicates that the toner IDs stored in the toner memories 42 of the toner cartridges 4 attached to the main casing 10 are to be stored in the USB memory 31 as toner information.

The "copy consumable IDs" instruction file is stored in the USB memory 31 in advance. When an image forming apparatus 1 under an agreement malfunctions or reaches the end of its service life and can no longer be used, for example, the company sends a new image forming apparatus 1 of the same model and an USB memory 31 to the user. The USB memory 31 stores therein a "copy consumable IDs" instruction file.

When the controller 61 determines in S37 that a "copy consumable IDs" instruction file is stored in the USB memory 31 (S37: YES), in S38 the controller 61 executes the copy determination process as a subroutine and subsequently advances to the process in S39. Here, the copy determination process will be described with reference to FIG. 6. FIG. 6 is a flowchart of a subroutine serving as an example of the copy determination process.

<Copy Determination Process>

In S51 of FIG. 6, the controller 61 first selects the toner cartridge 4 whose toner color is black (K) from among the four toner cartridges 4 attached to the main casing 10, and sets the selected toner cartridge 4 as a target cartridge to be subjected to the determination as to the remaining quantity of toner in the following process of S52. In S52 the controller 61 reads the remaining toner information from the toner memory 42 of the toner cartridge 4 set as the target cartridge and determines whether the remaining quantity of toner is less than or equal to a prescribed quantity. The process in S52 is an example of the determining.

For example, the controller 61 determines whether the remaining quantity of toner in the target toner cartridge 4 is less than or equal to the prescribed quantity, i.e., empty or near empty as indicated by "Empty" or "5% or less". In other words, the controller 61 determines whether the usage level of the target toner cartridge 4 is greater than or equal to a prescribed value.

When the controller 61 determines in S52 that the remaining quantity of toner in the target toner cartridge 4 is less than or equal to the prescribed quantity (S52: YES), the controller 61 advances to the process in S53. In S53 the controller 61 sets a copy permission flag associated with the toner cartridge 4 having black toner so that the copy permission flag indicates that copying is not permitted, and stores the copy permission flag in the main memory 62. Subsequently, the controller 61 advances to the process of S56 (described later). The copy permission flag indicates whether copying of the toner ID of the toner cartridge 4 to the USB memory 31 is permitted or not permitted.

On the other hand, when the controller 61 determines in S52 that the remaining quantity of toner in the target toner cartridge 4 is greater than the prescribed quantity (S52: NO), the controller 61 advances to the process in S54. In S54 the controller 61 sets the copy permission flag associated with the toner cartridge 4 having black toner so that the copy permission flag indicates that copying is permitted, and stores the copy permission flag into the main memory 62. Next, in S55 the controller 61 reads the toner ID from the toner memory 42 of the toner cartridge 4 set as the target cartridge, and stores the toner ID for the target cartridge in association with the toner color of the target cartridge (black in this case) in the USB memory 31 as "consumable ID information". The process in S55 is an example of the storing.

As an alternative, the controller 61 may simply read and store the toner ID read from the toner memory 42 of the target toner cartridge 4 in the USB memory 31 as the consumable ID information.

Subsequently, in S56 the controller 61 determines whether the process in S52 to S55 has been executed for all four colors (e.g., the colors cyan, magenta, yellow, and black) of toner cartridges 4 attached to the main casing 10. When the controller 61 determines in S56 that the process in S52 to S55 has not been executed for all colors of toner cartridges 4 (S56: NO), in S57 the controller 61 sets the toner cartridge 4 having the next toner color as the target cartridge and repeats the process in S52 to S56.

For example, the controller 61 sets each of the toner cartridges 4 as the target cartridge in the order of toner colors of black (K), cyan (C), magenta (M), and yellow (Y). The controller 61 then executes the process in S52 to S56 for each target cartridge.

Once the controller 61 determines in S56 that the process in S52 to S55 has been executed for all four colors of toner cartridges 4 attached to the main casing 10 (S56: YES), the controller 61 ends the copy determination process, returns to the main flowchart in FIG. 5, and advances to the process in S39.

Referring back to FIG. 5, in S39 the controller 61 sequentially reads the copy permission flags stored in the main memory 62 for the respective colors of the toner cartridge 4 attached to the main casing 10. Then, the controller 61 determines whether any of the copy permission flags stored in the main memory 62 in association with each of the toner colors indicates that copying is permitted.

When the controller 61 determines in S39 that none of the copy permission flags stored in the main memory 62 for the four toner colors indicates that copying is permitted (S39: NO), the controller 61 ends the USB storage process. In other words, the controller 61 ends the USB storage process when determining that the remaining toner quantities for all toner cartridges 4 attached to the main casing 10 are less than or equal to the prescribed quantity. Therefore, the USB memory 31 still stores therein the "copy consumable IDs" instruction file.

On the other hand, when the controller 61 determines in S39 that any of the copy permission flags stored in the main memory 62 for the four toner colors indicates that copying is permitted (S39: YES), the controller 61 advances to the process in S40. In S40 the controller 61 deletes the "copy consumable IDs" instruction file from the USB memory 31. In S41 the controller 61 subsequently reads a "reflect consumable IDs" instruction file from the main memory 62 and stores the read instruction file in the USB memory 31. Subsequently, the controller 61 ends the USB storage process.

Consequently, the "reflect consumable IDs" instruction file is stored in the USB memory 31. The "reflect consumable IDs" instruction file indicates that the toner IDs stored in the USB memory 31 are to be stored in the storage area 621 of the main memory 62 as toner information indicating the toner IDs of the newly attached special cartridges. The "reflect consumable IDs" instruction file is stored in the main memory 62 in advance.

On the other hand, when the controller 61 determines in S37 that the "copy consumable IDs" instruction file is not stored in the USB memory 31 (S37: NO), the controller 61 advances to the process in S42. In S42 the controller 61 determines whether a "reflect consumable IDs" instruction file is stored in the USB memory 31. When the controller 61 determines in S42 that a "reflect consumable IDs" instruction file is not stored in the USB memory 31 (S42: NO), the controller 61 ends the USB storage process.

On the other hand, when the controller 61 determines in S42 that a "reflect consumable IDs" instruction file is stored in the USB memory 31 (S42: YES), the controller 61 advances to the process in S43. In S43 the controller 61 reads the toner IDs stored in the USB memory 31 as "consumable ID information" and determines whether these toner IDs are currently stored in the storage area 621 of the main memory 62 as toner information. When the controller 61 determines in S43 that the toner IDs read from the USB memory 31 are stored in the storage area 621 of the main memory 62 as toner information (S43: YES), the controller 61 ends the USB storage process.

On the other hand, when the controller 61 determines in S43 that the toner IDs read from the USB memory 31 are not stored in the storage area 621 of the main memory 62 as toner information (S43: NO), the controller 61 advances to the process in S44. In S44 the controller 61 reads the toner IDs and toner colors stored in the USB memory 31 as the consumable ID information. Then, the controller 61 stores these toner IDs and toner colors in the storage area 621 of the main memory 62 as toner information. Thus, when special cartridges associated with toner IDs stored in the USB memory 31 are attached to the main casing 10, these special cartridges can be used to perform subscription printing (see FIG. 4).

In S45 the controller 61 deletes the toner IDs and toner colors stored in the USB memory 31 as the consumable ID information from the USB memory 31. The controller 61 also deletes the "reflect consumable IDs" instruction file from the USB memory 31 in S45. In S46 the controller 61 subsequently reads the "copy consumable IDs" instruction file from the main memory 62 and stores the read instruction file in the USB memory 31. Subsequently, the controller 61 ends the USB storage process. Note that the "copy consumable IDs" instruction file is stored in the main memory 62 in advance.

<Transferring Toner IDs from Old Device to New Device>

While the description as to the USB storage process performed on the image forming apparatus 1 has been made in detail, hereinafter the process of transferring toner IDs from an old device to a new device will be described.

For the purpose of describing how toner IDs are transferred from an old device to a new device, the image forming apparatus 1 currently used by the user will be referred to as "old device". An image forming apparatus 1 the user intends to use in place of the old device will be referred to as "new device". The new device corresponds to "another image forming apparatus" in the present disclosure.

The controller 61 in the old device executes the determination process of S31 to S36 described above. When the controller 61 determines in S37 that a "copy consumable IDs" instruction file is stored in the USB memory 31 (S37: YES), in S38 the controller 61 executes the copy determination process as a subroutine and subsequently performs the process in S39 to S41.

As a result of the above process, the USB memory 31 connected to the old device stores therein the toner IDs of the toner cartridges 4 currently used in the old device. Additionally, the "copy consumable IDs" instruction file is deleted from the USB memory 31 in S40 and the "reflect consumable IDs" instruction file is stored in the USB memory 31 in S41.

Next, both the toner cartridges 4 that has been used in the old device, and the USB memory 31 storing therein the toner IDs of the toner cartridges 4 and the "reflect consumable IDs" instruction file are attached to the new device. When the USB memory 31 is connected to the new device, the controller 61 of the new device executes the determination process in S31 to S36.

Since the "copy consumable IDs" instruction file has been deleted from the USB memory 31 attached to the new device, in S37 the controller 61 determines that the USB memory 31 does not store therein a "copy consumable IDs" instruction file (S37: NO). Accordingly, the controller 61 executes the process in S42 to S46.

Through this process, the controller 61 of the new device can copy the toner IDs stored in the toner memories 42 of the toner cartridges 4 that were used on the old device to the main memory 62 of the new device via the USB memory 31. As a result, the controller 61 of the new device permits subscription printing using the toner cartridges 4 previously used on the old device by executing the process in S18 after reaching a NO-determination in S13 of FIG. 4. Accordingly, the process in S18 is also an example of the permitting.

Note that, if a new special toner cartridge 4 has already been ordered for any of the toner cartridges 4 used in the old device, the on-order flag stored in the fifth area 425 of the toner memory 42 of the toner cartridge 4 indicates that an order for a new toner cartridge 4 has already been placed. Accordingly, when the toner cartridges 4 are attached to the main casing 10 of the new device, the controller 61 of the new device can read the on-order flag stored in the toner memory 42 of the toner cartridge 4 and determine that a new toner cartridge 4 has been ordered, thereby appropriately preventing duplicate orders of new toner cartridges 4.

<Example of Cartridge Order Process>

Figure 7:
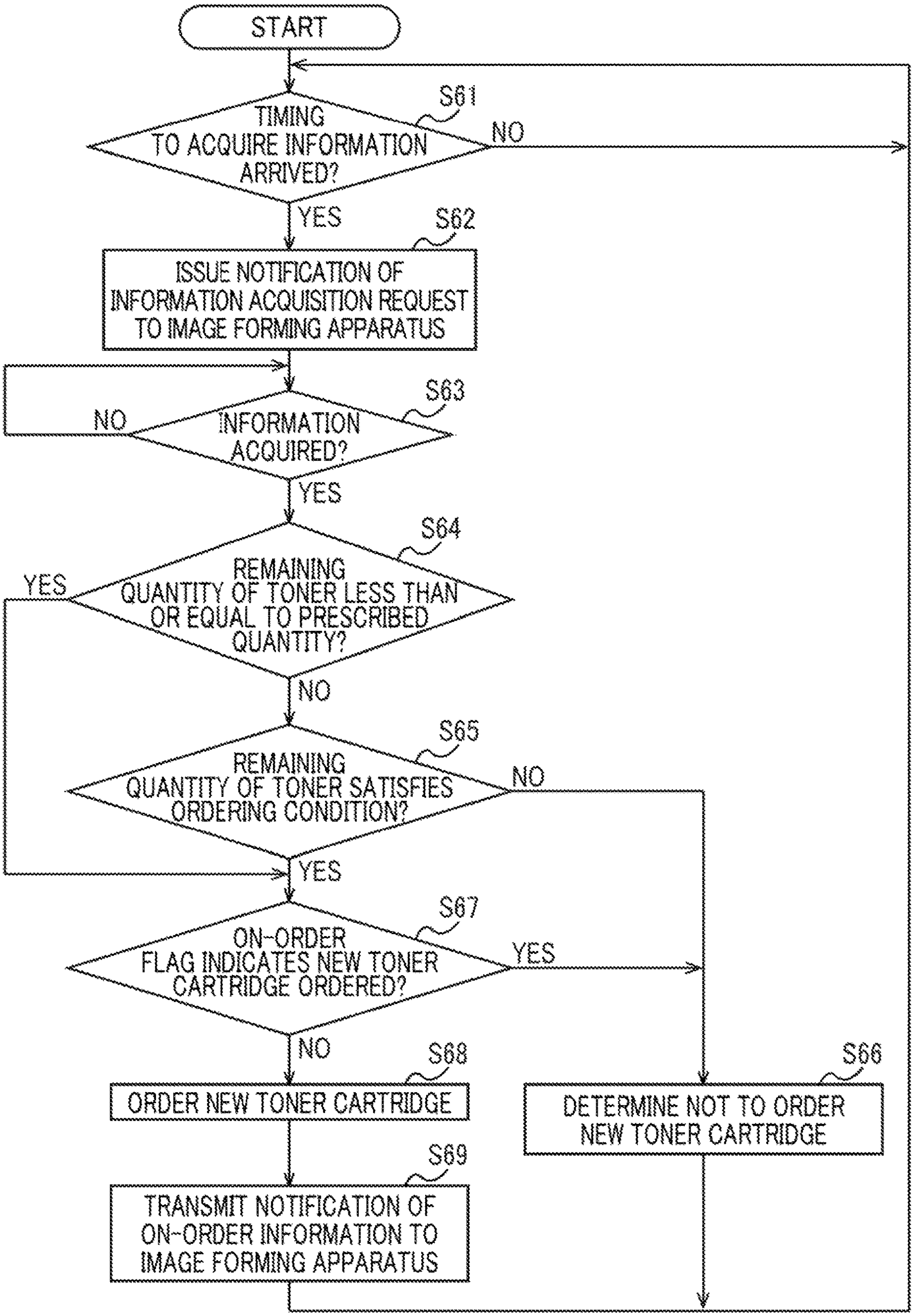
FIG. 7 is a flowchart illustrating an example of steps in a cartridge order process executed by the server.

Next, an example of a cartridge order process executed by the server controller 81 of the server 8 to order a new special cartridge will be described with reference to FIG. 7. FIG. 7 is a flowchart illustrating an example of steps in the cartridge order process executed by the server controller 81.

In S61 at the beginning of the process in FIG. 7, the server controller 81 waits for a timing to acquire information related to each toner cartridge 4 attached to the main casing 10 of the image forming apparatus 1 (S61: NO). The server controller 81 advances to the process in S62 when determining in S61 that the timing to acquire information related to each toner cartridge 4 has arrived (S61: YES). In S62 the server controller 81 issues a notification of an information acquisition request to the image forming apparatus 1 via the server communication interface 83 requesting the image forming apparatus 1 to transmit information related to each toner cartridge 4 attached to the main casing 10.

In S63 the server controller 81 waits until the server controller 81 receives information related to the toner cartridges 4 via the server communication interface 83 (S63: NO). Information related to toner cartridges 4 includes the device ID of the image forming apparatus 1; and the toner ID, the toner type information, the remaining toner information, the new product flag, and the on-order information, for example, for each toner cartridge 4 stored in the toner memory 42 of each toner cartridge 4.

When the server controller 81 receives information related to each toner cartridge 4 attached to the main casing 10 of the image forming apparatus 1 via the server communication interface 83 (S63: YES), the server controller 81 stores the received information in the server memory 82. In S64 the server controller 81 reads the remaining toner information for each toner cartridge 4 from the received information and determines for each toner cartridge 4 whether the remaining quantity of toner is less than or equal to a prescribed quantity indicating that when a new toner cartridge 4 needs to be ordered.

When the server controller 81 determines in S64 that the remaining quantity of toner in any toner cartridge 4 is less than or equal to the prescribed quantity (S64: YES), which requires order of a new toner cartridge 4, the server controller 81 advances to the process in S67 (described later). On the other hand, when the server controller 81 determines in S64 that the remaining quantity of toner in each toner cartridge 4 is greater than the prescribed quantity at which a new toner cartridge 4 needs to be ordered (S64: NO), the server controller 81 advances to the process in S65. In S65 the server controller 81 determines whether the remaining quantity of toner in each toner cartridge 4 satisfies an ordering condition for ordering a new toner cartridge 4.

For example, the server controller 81 determines that the ordering condition is satisfied when the number of sheets printed by the image forming apparatus 1 is greater than or equal to a threshold value, i.e., that the remaining quantity of toner in the toner cartridge 4 is expected to reach "Empty" within a few days based on the toner usage rate. The server controller 81 also determines that the ordering condition is satisfied if a new cartridge is expected to be ordered within a few days based on the order history in the past.

When the server controller 81 determines in S65 that the remaining toner quantity of none of the toner cartridges 4 satisfies the ordering condition for ordering a new toner cartridge 4 (S65: NO), the server controller 81 advances to the process in S66. In S66 the server controller 81 determines not to order a new toner cartridge 4 (a special cartridge) and subsequently repeats the process from S61.

On the other hand, when the server controller 81 determines in S65 that the remaining toner quantity of any toner cartridge 4 satisfies the ordering condition for ordering a new toner cartridge 4 (a special cartridge; S65: YES), the server controller 81 advances to the process in S67. In S67 the server controller 81 reads the on-order information from the information related to each toner cartridge 4 received in S63 and determines whether the on-order flag included in the on-order information indicates that a special cartridge has already been ordered.

When the server controller 81 determines in S67 that the on-order flag indicates that a new toner cartridge 4 has already been ordered (S67: YES), the server controller 81 advances to the process in S66. In S66 the server controller 81 determines not to order a special cartridge and returns to S61 described above.

On the other hand, when the server controller 81 determines in S67 that the on-order flag indicates a new toner cartridge 4 has not been ordered (S67: NO), the server controller 81 advances to the process in S68. In S68 the server controller 81 orders a new toner cartridge 4 (a special cartridge). In S69 the server controller 81 transmits a notification of on-order information via the server communication interface 83 to the image forming apparatus 1 associated with the device ID received in S63. The on-order information indicates that a new toner cartridge 4 (special cartridge) has been ordered. Subsequently, the server controller 81 repeats the process from S61.

Hence, when the remaining quantity of toner in a toner cartridge 4 is less than or equal to the prescribed quantity, the controller 61 receives on-order information from the server 8 via the communication interface 63 indicating that a new toner cartridge 4 (a special cartridge) has been ordered. The controller 61 then overwrites the on-order flag stored in the fifth area 425 of the toner memory 42 with information indicating that a special cartridge has been ordered, and stores the overwritten flag in the fifth area 425 of the toner memory 42.

Modifications of Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<Modification 1>

For example, each of consumables such as a belt unit including the transfer belt 70, the drive roller 71, the follow roller 72, and the like; the light source units 50; a fixing unit; and the like may include a consumable memory similar to those in the toner cartridges 4 (i.e., the toner memories 42). The drum memories 22 provided in the drum cartridges 20, which are examples of the consumable, are also examples of the consumable memory.

The consumable memory may store therein status information indicating whether the consumable is a new product or a used product, unique identification information for individually identifying the consumable, type information indicating whether the consumable is a special consumable or a normal consumable, and usage information indicating the usage level of the consumable.

Further, when a new consumable is attached to the main casing 10, the controller 61 may store the identification information stored in the consumable memory of the consumable in the main memory 62. Further, when a new consumable is attached to the main casing 10, the controller 61 may overwrite the status information stored in the consumable memory of the consumable so that the status information indicates that the consumable is a used product. A "copy consumable IDs" instruction file may be stored in the USB memory 31 in advance.

In this way, similar to the special toner cartridges 4 in the above-described embodiment, the new consumable is attached to the image forming apparatus 1 which is a contracted machine, and the USB memory 31 is electrically connected to the USB connector 103. As a result, the controller 61 deletes the "copy consumable IDs" instruction file from the USB memory 31. The controller 61 can then store both the consumable ID (i.e., the identification information of the new consumable) and a "reflect consumable IDs" instruction file in the USB memory 31.

Further, consumables that were used on an image forming apparatus 1 which is(was) a contracted machine are attached to another image forming apparatus 1 that serves as a contracted machine. Further, the USB memory 31 that was connected to the previous image forming apparatus 1 is electrically connected to the other image forming apparatus 1. As such, the controller 61 can read the consumable IDs from the USB memory 31 and store these consumable IDs in the main memory 62, thereby enabling the other image forming apparatus 1 to use the consumables. The controller 61 also deletes the consumable IDs and the "reflect consumable IDs" instruction file from the USB memory 31. Subsequently, the controller 61 can store a "copy consumable IDs" instruction file in the USB memory 31.

<Modification 2>

The drum cartridge 20 may include the developing roller 41 in addition to the photosensitive drum 21, the cartridge casing, the drum memory 22, and a charger. In this case, the photosensitive drum 21, the drum memory 22, the charger, and the developing roller 41 are provided in the cartridge casing of the drum cartridge 20; and the toner cartridge 4 includes the cartridge casing and the toner memory 42 but does not include the developing roller 41. The cartridge casing of the toner cartridge 4 accommodates therein toner. The outer circumferential surface of the developing roller 41 contacts the outer circumferential surface of the photosensitive drum 21 inside the drum cartridge 20.

<Modification 3>

The toner cartridge 4 may be configured of two cartridges (not illustrated). In this case, one of the two cartridges constituting the toner cartridge 4 includes the developing roller 41, while the other of the two cartridges includes the cartridge casing and the toner memory 42. The cartridge casing accommodates therein toner.

<Modification 4>

The image forming apparatus 1 may include a single cartridge (not illustrated) in place of the drum cartridge 20 and the toner cartridge 4. This single cartridge includes the photosensitive drum 21, a cartridge casing, a memory, the charger, and the developing roller 41. The outer circumferential surface of the developing roller 41 contacts the outer circumferential surface of the photosensitive drum 21 inside the single cartridge. The cartridge casing of the single cartridge accommodates therein toner.

<Modification 5>

In the image forming apparatus 1, the drum cartridges 20 and the corresponding toner cartridges 4 may be attachable to and detachable from the main casing 10 independently of each other.

<Modification 6>

The image forming apparatus 1 may be a multifunction printer (MFP) also having other functions such as a scanning or facsimile function. An image forming apparatus 1 configured as an MFP can still execute the same various processes described in the above embodiment. The image forming apparatus 1 according to this modification exhibits the same advantages as the image forming apparatus 1 in the embodiment described above.

<Modification 7>

The printing medium used in the image forming apparatus 1 is not limited to paper but may be tape, for example. In a case where the printing medium is tape, a tape cassette for supplying tape is attached to the image forming apparatus 1, and the image forming apparatus 1 performs printing on the tape conveyed from the tape cassette. In this case, the image forming apparatus 1 may be a laser printer or an inkjet printer.

<Modification 8>

The image forming apparatus 1 may be an inkjet printer. In a case where the image forming apparatus 1 is an inkjet printer, ink cartridges are attachable to the cartridge retaining portions 13 of the image forming apparatus 1 instead of the drum cartridges 20 and the toner cartridges 4 described in the embodiment. There is no particular restriction on the number of ink cartridges attachable to the image forming apparatus 1. For example, a total of four ink cartridges corresponding to the four colors of cyan, magenta, yellow, and black may be attached to the image forming apparatus 1, or a single ink cartridge for the color of black may be attached to the image forming apparatus 1.

Each of the ink cartridges includes an ink memory mounted therein. The ink memory stores therein an ink ID, ink type information, a remaining quantity of ink, a new product flag, and on-order information, for example. The ink ID is information similar to the toner ID. The ink type information is information similar to the toner type information.

Similar to the above embodiment, flow in the processes of FIGS. 1 through 7 are executed also in a case where the image forming apparatus 1 is an inkjet printer. Specifically, in a case where the image forming apparatus 1 is the inkjet printer, the terms "toner cartridge 4," "toner memory 42," "toner ID," "toner type information", and "remaining quantity of toner" in the description of the embodiment described above are replaced with the terms "ink cartridge", "ink memory", "ink ID", "ink type information", and "remaining quantity of ink", respectively. Thus, the same advantages described for the image forming apparatus 1 according to the embodiment can be exhibited in a case where the image forming apparatus 1 is the inkjet printer.

<Implementation through Software>

The functions of the image forming apparatus 1 can be implemented by a program that controls a computer to function as the image forming apparatus 1 and that controls the computer to function as the controller 61 of the image forming apparatus 1.

In this case, the image forming apparatus 1 includes a computer possessing at least one controller (e.g., a processor) and at least one storage device (e.g., a memory) as a hardware required for executing the program. Each function described in the above embodiment is implemented by executing the program using these control devices and storage devices.

The program described above may be stored in one or more non-transitory computer-readable storage media. These storage media may be provided in the image forming apparatus 1 but need not be. In the latter case, the program described above may be transmitted to the image forming apparatus 1 through any wired or wireless transmission medium.

All or some of the functions of the controller 61 may also be implemented by logic circuits. For example, an integrated circuit having logic circuits that function as the above control blocks falls within the scope of the present disclosure.

What is claimed is:

1. An image forming apparatus comprising:

a main casing to which a consumable is attachable, the consumable including a consumable memory storing therein:

status information indicating whether the consumable is new or used;

identification information for individually identifying the consumable;

usage information indicating a usage level of the consumable; and type information indicating whether the consumable is a special consumable that can be used in the image forming apparatus when the image forming apparatus is under a concluded agreement or a normal consumable that can be used in the image forming apparatus irrespective of whether or not the image forming apparatus is under the concluded agreement;

a main memory; and a controller configured to perform:

when the status information indicates that the consumable is new, storing the identification information in the main memory;

when the status information indicates that the consumable is new, overwriting the status information so that the status information indicates that the consumable is used;

when the status information indicates that the consumable is used and the type information indicates that the consumable is the special consumable, determining whether the identification information is already stored in the main memory;

when determining that the identification information is already stored in the main memory, permitting use of the consumable in the image forming apparatus;

when determining that the identification information is not stored in the main memory, prohibiting use of the consumable in the image forming apparatus;

when the usage information indicates that the usage level is greater than or equal to a prescribed value and the type information indicates that the consumable is the special consumable, storing on-order information in the consumable memory, the on-order information indicating that an order has been placed for a new consumable; and in a state where an external memory that can be physically connected to the main casing from an outside of the main casing is connected to the main casing, storing the identification information stored in the main memory in the external memory, wherein, by the external memory being physically connected to another image forming apparatus, the another image forming apparatus permits use of the consumable in the another image forming apparatus on the basis of the identification information stored in the external memory.

2. The image forming apparatus according to claim 1, wherein the controller is configured to further perform:

determining whether the usage level of the consumable is greater than or equal to the prescribed value, wherein, when determining that the usage level of the consumable is less than the prescribed value, the controller performs the storing the identification information, and wherein, when determining that the usage level of the consumable is greater than or equal to the prescribed value, the controller does not perform the storing the identification information.

3. The image forming apparatus according to claim 1, wherein, of the identification information stored in the main memory, the identification information of the consumable attached to the main casing at the time that the external memory is physically connected to the main casing is stored in the external memory in the storing the identification information.

4. The image forming apparatus according to claim 1, wherein the external memory is a USB memory.

5. A method of controlling an image forming apparatus comprising a main memory and a main casing to which a consumable is attachable, the consumable including a consumable memory storing therein status information, identification information for individually identifying the consumable, usage information, and type information, the status information indicating whether the consumable is new or used, the usage information indicating a usage level of the consumable, the type information indicating whether the consumable is a special consumable that can be used in the image forming apparatus when the image forming apparatus is under a concluded agreement or a normal consumable that can be used in the image forming apparatus irrespective of whether or not the image forming apparatus is under the concluded agreement, the method comprising:

when the status information indicates that the consumable is new, storing the identification information in the main memory;

when the status information indicates that the consumable is new, overwriting the status information so that the status information indicates that the consumable is used;

when the status information indicates that the consumable is used and the type information indicates that the consumable is the special consumable, determining whether the identification information is already stored in the main memory;

when determining that the identification information is already stored in the main memory, permitting use of the consumable in the image forming apparatus;

when determining that the identification information is not stored in the main memory, prohibiting use of the consumable in the image forming apparatus;

when the usage information indicates that the usage level is greater than or equal to a prescribed value and the type information indicates that the consumable is the special consumable, storing on-order information in the consumable memory, the on-order information indicating that an order has been placed for a new consumable;

in a state where an external memory that can be physically connected to the main casing from an outside of the main casing is connected to the main casing, storing the identification information stored in the main memory in the external memory; and when the external memory is physically connected to another image forming apparatus, permitting use of the consumable in the another image forming apparatus on the basis of the identification information stored in the external memory.

6. The method according to claim 5, further comprising:

determining whether the usage level of the consumable is greater than or equal to the prescribed value, wherein the storing the identification information is performed when determining that the usage level of the consumable is less than the prescribed value, and wherein the storing the identification information is not performed when determining that the usage level of the consumable is greater than or equal to the prescribed value.

7. The method according to claim 5, wherein, of the identification information stored in the main memory, the identification information of the consumable attached to the main casing at the time that the external memory is physically connected to the main casing is stored in the external memory in the storing the identification information.

8. The method according to claim 5, wherein the external memory is a USB memory.

* * * * *